J. H. TRAVIS.
Extension Foot-Rests for Chairs.
No. 5,690. Reissued Dec 16, 1873.
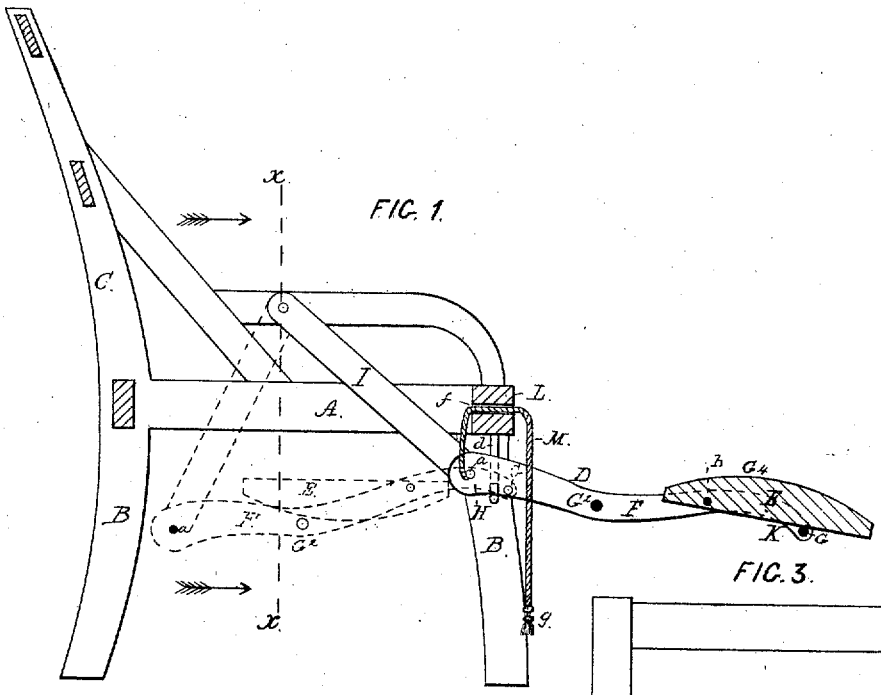
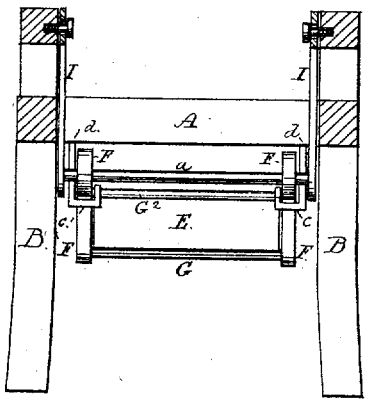
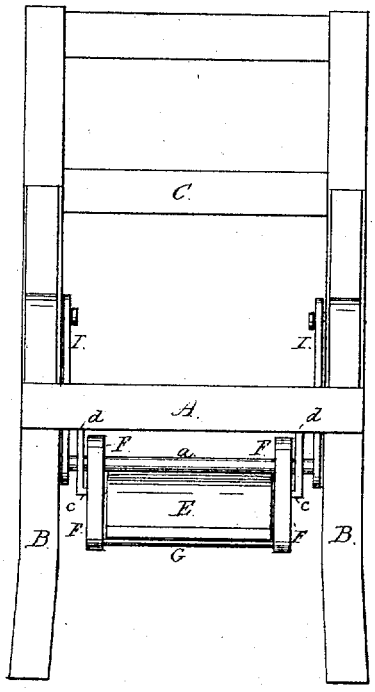
WITNESSES.
C. A. Pease —
J. P. McElroy.
INVENTOR.
Joseph H. Travis
per.
Brown Brothers
Attorneys.
AM. PHOTO-LITHOGRAPHIC CO. N.Y. (OSBORNE'S PROCESS)

UNITED STATES PATENT OFFICE.

JOSEPH H. TRAVIS, OF CHARLESTOWN, MASSACHUSETTS.

IMPROVEMENT IN EXTENSION FOOT-RESTS FOR CHAIRS.

Specification forming part of Letters Patent No. 132,503, dated October 22, 1872; reissue No. 5,690, dated December 16, 1873; application filed July 22, 1873.

*To all whom it may concern:*

Be it known that I, JOSEPH H. TRAVIS, of Charlestown, in the State of Massachusetts, have invented an Improvement in Extension Foot-Rests for Chairs, of which the following is a specification:

This invention relates to chairs having a foot or leg rest, and particularly to that class of chairs in which the foot or leg rest is carried by a frame arranged upon the chair to be inclosed within its legs or supporting portion, and to be drawn out therefrom into position for use. A chair of this class is shown and described in the schedule annexed to the Letters Patent issued to me, dated June 6, 1871, No. 115,787.

This invention consists of a rest suspended beneath the chair-frame by pendent levers or rods, and capable of being inclosed within its legs beneath the seat and drawn out therefrom, and combining therewith a foot-rest arranged between the side rails of the rest-frame in such a manner as to be independently advanced thereon, and supported against the weight of the foot or leg, or be folded within said rest-frame, as will be more fully hereinafter set forth.

In the accompanying plate of drawing my invention is illustrated, Figure 1 being a central vertical section from front to back of chair, showing the foot-rest as distended, and in dotted lines as under and inclosed within the chair-frame. Fig. 2, a transverse vertical section in plane of line *x x*, Fig. 1. Fig. 3, a front view.

A in the drawing represents the base of chair-seat; B, the supporting-legs; and C, the back-frame, constructed in themselves with the seat and back frames upholstered in any of the usual modes and styles; D, a frame, which, under the present invention, carries the foot and leg rest E of the chair. The frame D is constructed of side rails F joined together between its two ends by cross-rounds G $G^2$. By the end H the frame D is hung upon the cross-rod *a*, which is carried by the lower ends of two similar downward-projecting levers or arms, I, hung at their upper ends to the chair-frame A, one upon each side of the same. At the end K of the frame D is arranged the foot and leg rest E. The rest E is located between the two side rails F of the frame D, and near one end, as shown at *b*, Fig. 1. It is hung to each rail F, so that it can be revolved or turned over to bring its inclined or cushioned surface $G^4$ uppermost, as shown in Fig. 1, or lowermost, as shown by dotted lines in same figure. As regards one end of the rest E, its hanging to the frame D supports it in both of its positions, above stated; but its other end is supported by the round G of the frame D in the one or uppermost position, and by the round $G^2$ of the frame D in the other or lowermost position of its cushioned surface $G^4$. The frame D is supported at the front of the chair upon the horizontal arms *c* of staple-pins *d*, fixed in the front rail L of the chair-frame, and on these arms the frame D rests when it is drawn out into the position shown in Fig. 1, or pushed in under the chair-frame into the position shown by dotted lines, same figure. M, a cord attached to rest-frame, and passed through the hole *f* in front chair-rail L. This cord M has a tassel or button, *g*, and by it the rest-frame can be drawn out from under the chair-frame when desired to use the rest. When the rest-frame D is out, the cushion-surface of the rest is brought to the upper side, and before pushing the frame D in under the chair-frame A, the rest is reversed in position—that is, its cushioned surface is brought to the under side, bringing the rest compactly within the chair-frame. Under an arrangement of the rest E upon its carrying-frame, such as herein described and shown in the drawings, obviously when its carrying-frame is drawn out from the chair, and the rest E overturned, as stated, the the rest E then is advanced in position as regards the outward projection of its carrying-frame beyond the chair-frame. This advancement of the rest is of itself, and independent of the frame carrying it, and as a consequence it secures under a given length of frame D, which length necessarily is limited substantially to the length or depth of the chair from front to rear, a projection of the rest proper from the chair for supporting the feet or legs of the occupant to the best advantage and comfort.

Having thus described my invention, what I claim, and desire to secure by Letters Patent, is—

1. The rest-frame D suspended beneath the chair by the levers I I, for the movement described, in combination with the foot-rest E pivoted between the side rails of the rest-frame, and adapted to lay within the same, and when unfolded be retained in a firm position, substantially as described, and for the purpose set forth.

2. The frame D composed of the side rails F F, rounds G $G^2$, and reversible foot-rest E, in combination with the suspended levers I I and cross-rod *a*, substantially as shown and described, for the purpose specified.

J. H. TRAVIS.

Witnesses:
J. P. McElroy,
Edwin W. Brown.